United States Patent [19]

Edmunds et al.

[11] 4,091,837
[45] May 30, 1978

[54] FREEZEPROOF BREATHER VALVE

[75] Inventors: Robert H. Edmunds, Glenview; John R. Huebner, Arlington Heights; James A. Skurka, Niles; Francis B. Wilson, Wauconda, all of Ill.

[73] Assignee: Vapor Corporation, Chicago, Ill.

[21] Appl. No.: 710,372

[22] Filed: Aug. 2, 1976

[51] Int. Cl.² .......................................... F16K 17/194
[52] U.S. Cl. .................................... 137/341; 137/469; 137/493.7; 137/526; 137/527; 137/533.25; 251/65; 251/144; 251/368
[58] Field of Search ................... 137/341, 493.7, 493.8, 137/493.9, 469, 526, 527.8, 527, 533.25; 220/203, 204, 209; 251/65, 368

[56] References Cited

U.S. PATENT DOCUMENTS

| 471,615 | 3/1892 | King | 137/493.9 |
| 1,918,807 | 7/1933 | Glab | 220/203 |
| 2,226,022 | 12/1940 | Shutts | 137/493.8 X |
| 2,556,557 | 6/1951 | Schweitzer | 137/341 |
| 2,732,856 | 1/1956 | Jurs et al. | 137/493.8 X |
| 3,294,115 | 12/1966 | Koenigsberg | 251/65 |
| 3,598,145 | 8/1971 | Wolfson | 251/368 X |
| 3,658,085 | 4/1972 | Cannella | 137/341 |

Primary Examiner—Robert G. Nilson
Attorney, Agent, or Firm—Francis J. Lidd

[57] ABSTRACT

A valve for controlling the pressure within a tank to prevent excessive above or below atmospheric pressure conditions, including a pressure responsive valve and a vacuum responsive valve, wherein each valve includes a pallet with seals and blowdown rings of polytetrafluorethylene material, which is commercially marketed under the trademark Teflon. The pressure pallet includes guide means having Teflon parts, while the vacuum responsive valve includes hinge means having coacting Teflon parts. The breather valve includes structure defining a vertically extending vent structure having an opening arranged alongside the tank in which the valve is mounted, which opening is positioned to avoid being sealed by any normal buildup of ice and snow.

20 Claims, 12 Drawing Figures

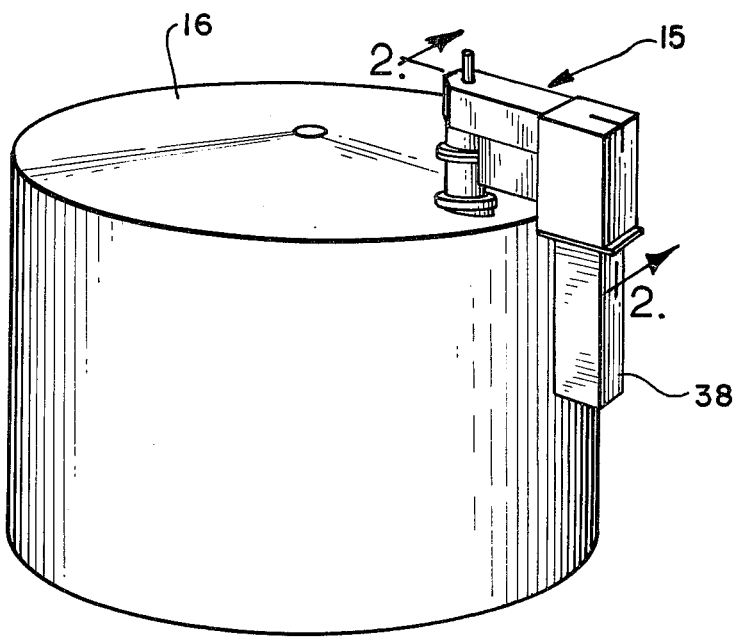
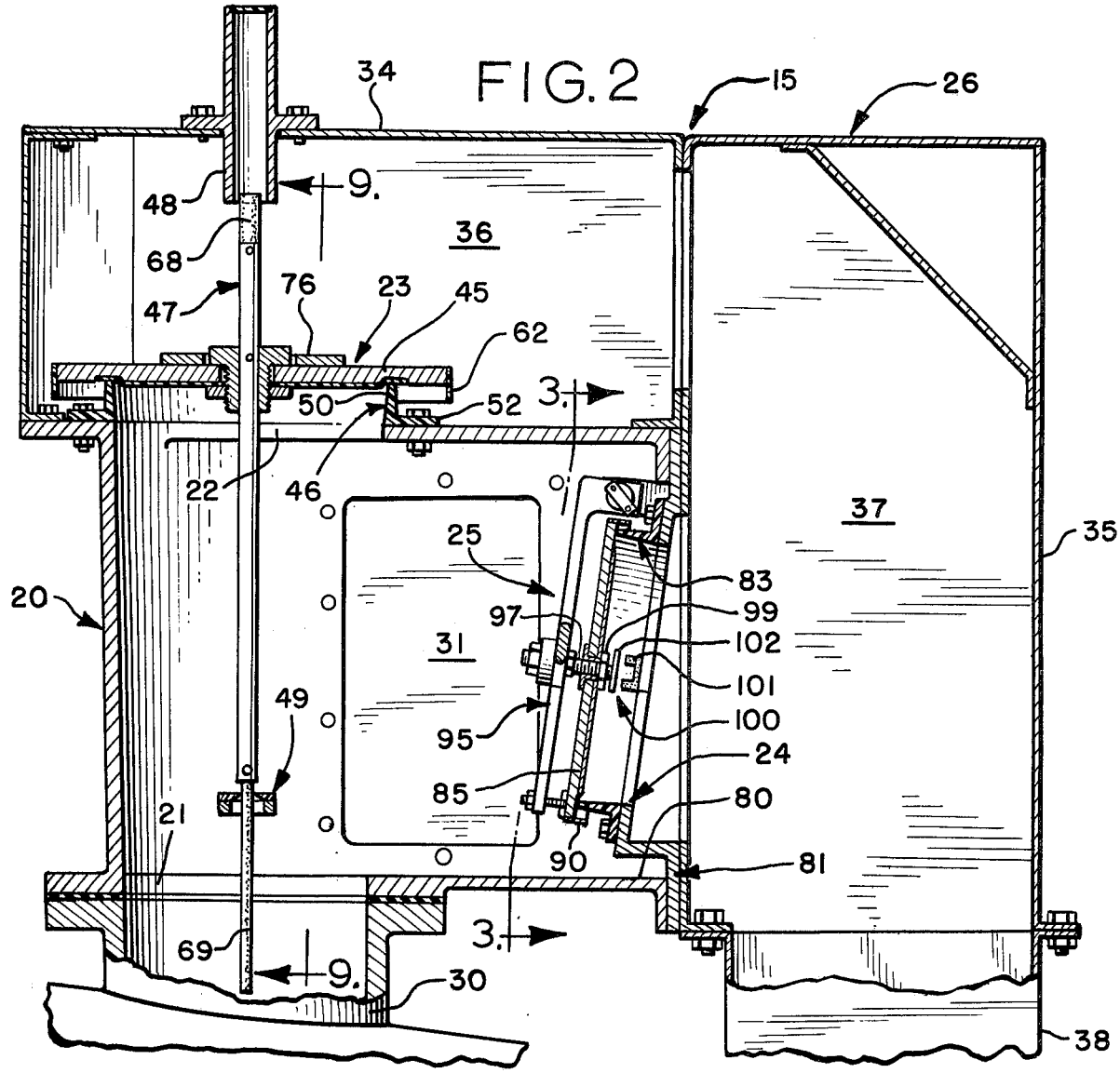

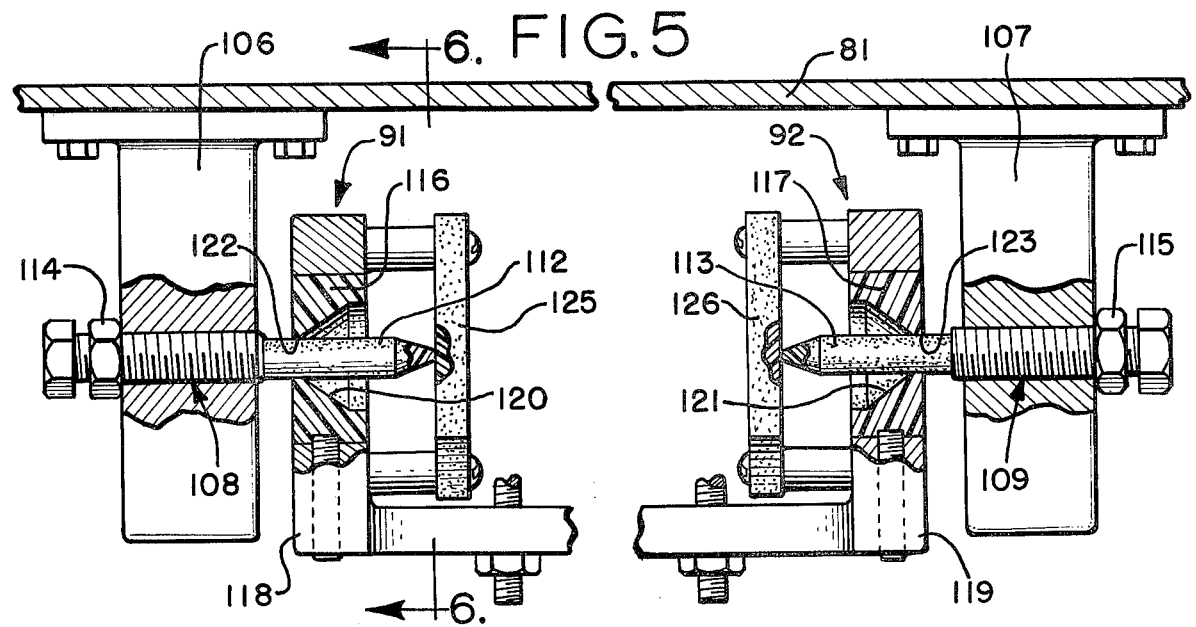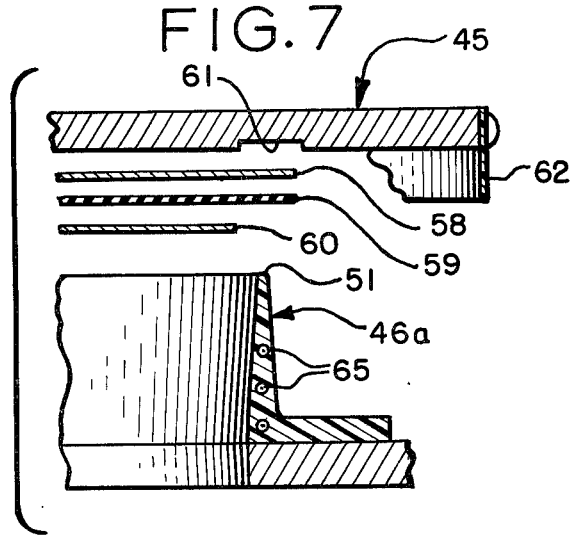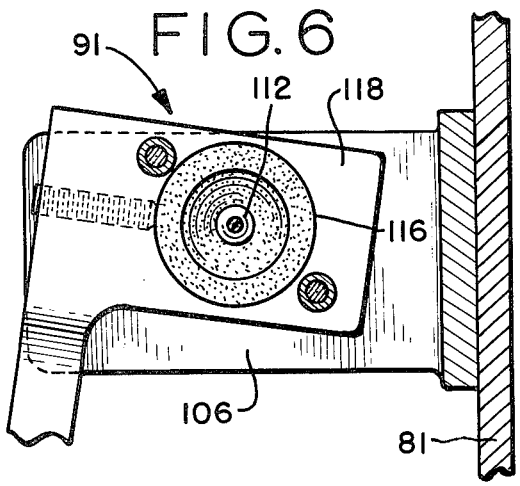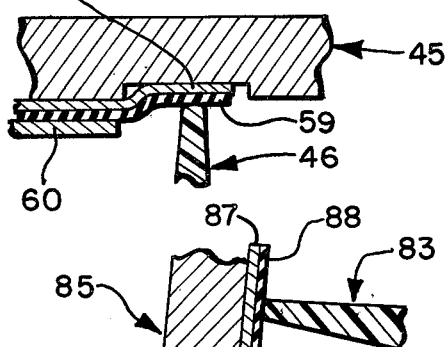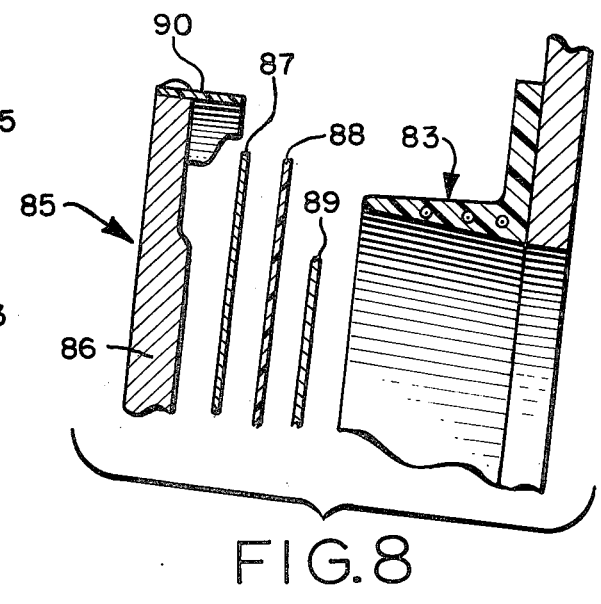

FREEZEPROOF BREATHER VALVE

This invention relates in general to a valve for controlling the pressure conditions within a tank, and more particularly to a freezeproof breather valve for tanks which prevents the buildup of excessive pressures, and still more particularly to a freezeproof breather valve for petroleum storage tanks to protect the tanks from the effects of excessive vapor pressure in climates encountering severe freezing temperatures.

The valve of the present invention is especially suitable for controlling pressure conditions within petroleum storage tanks located in severe freezing climates, such as may be encountered in much of Alaska. One particular difficulty encountered is the accumulation of large amounts of ice and snow on the top of a tank during the winter season. The present invention provides venting for a breather valve to overcome this difficulty by providing a vertically extending vent having an opening facing downwardly and positioned at a point low enough to avoid being sealed off by ice and snow under normal conditions. A further difficulty encountered results from the high moisture content of crude oil in the tanks where the oil is piped into the tanks at relatively high temperatures which constantly cause evaporation of the moisture from the crude oil and which then condenses on the underside of the tank and the breather valve assembly because of its much lower temperature and which then can cause freezing of the valve and ultimately malfunctioning of same.

The breather valve of the present invention as mounted on a tank includes a pressure responsive valve and a vacuum responsive valve, each of which may be adjusted to open and vent the tank to atmosphere in event of a given pressure condition. While this general type of valve structure is known, such as in U.S. Pat. Nos. 2,732,856, 2,732,857 and 2,971,531, it is not known heretofore to provide such a valve arrangement where it can withstand freezing and icing conditions and still function as desired. Further, the vacuum responsive valve portion of the present invention is generally vertically arranged such that the valve will close under gravitational force and also is provided with the biasing force of a magnet to hold it in closed position until the pressure differential on opposite sides of the pallet is sufficient to overcome the magnetic biasing force and the gravitational force. Such a vent valve with magnetic biasing means is generally disclosed in U.S. Pat. No. 3,502,361, but the valve of the present invention differentiates in that the magnetic latch is arranged centrally of the pallet.

Prior known valves have not been capable of operation in freezing ice conditions. However, the valve of the present invention is unique in that both the pressure and vacuum pallet assemblies utilize virgin polytetrafluorethylene materials, such as marketed under the trademark Teflon, for the pallet seals and blowdown rings, and further since the vacuum pallet assembly includes a hinge having virgin polytetrafluorethylene components. Under test conditions it has been found that a valve of the present invention using virgin polytetrafluorethylene components did not have their pressure or vacuum calibrations materially affected by the formation of ice on the valve components. In a further modification, the seats of the valve may be electrically heated. For simplicity purposes, Teflon will be generally used hereafter in describing the virgin polytetrafluorethylene material used for certain valve components.

It is therefore an object of the present invention to provide a new and improved breather valve for storage tanks containing petroleum, which valve is essentially freezeproof in character and capable of operating under severe icing conditions.

Another object of this invention is in the provision of a hinge mounted generally vertically arranged differential pressure pallet vent valve including means for applying a magnetic biasing force centrally of the pallet, a virgin polytetrafluorethylene pallet seal for the pallet, and a virgin polytetrafluorethylene hinge structure.

A still further object of the present invention is to provide a differential pressure vertical pallet vent valve having a pallet movable between open and closed positions relative to a pallet seat wherein the pallet seat is electrically heated.

A still further object of the present invention is in the provision of a weight-loaded pressure relief valve including a pallet movable between open and closed positions relative to a pallet seat wherein the pallet includes a virgin polytetrafluorethylene pallet seal and blowdown ring.

Another object of the present invention is in the provision of a freezeproof breather valve which includes both pressure and vacuum relief portions having virgin polytetrafluorethylene components which are resistant to freezeup by ice formation.

Other objects, features and advantages of the invention will be apparent from the following detailed disclosure, taken in conjunction with the accompanying sheets of drawings, wherein like reference numerals refer to like parts, in which:

FIG. 1 is a general perspective view of a tank having a freezeproof breather valve according to the present invention mounted thereon;

FIG. 2 is an enlarged transverse sectional view taken through the valve of FIG. 1 and generally along line 2—2 of FIG. 1;

FIG. 5 is a broken sectional view taken substantially along line 5—5 of FIG. 3 showing the details of the hinges for mounting the vacuum pallet;

FIG. 6 is a vertical sectional view taken substantially along line 6—6 of FIG. 5;

FIG. 7 is an enlarged fragmentary and somewhat exploded view of a seat and pallet assembly and illustrating also heating elements utilized in the seat for the valve of the present invention;

FIG. 7a is a fragmentary sectional view illustrating the manner in which the seat engages the diaphragm of the pressure responsive pallet assembly;

FIG. 8 is an exploded fragmentary and sectional view of the vacuum responsive pallet assembly and seat;

FIG. 8a is a view similar to FIG. 7a illustrating the closing of the vacuum pallet on its seat;

Figure 4:
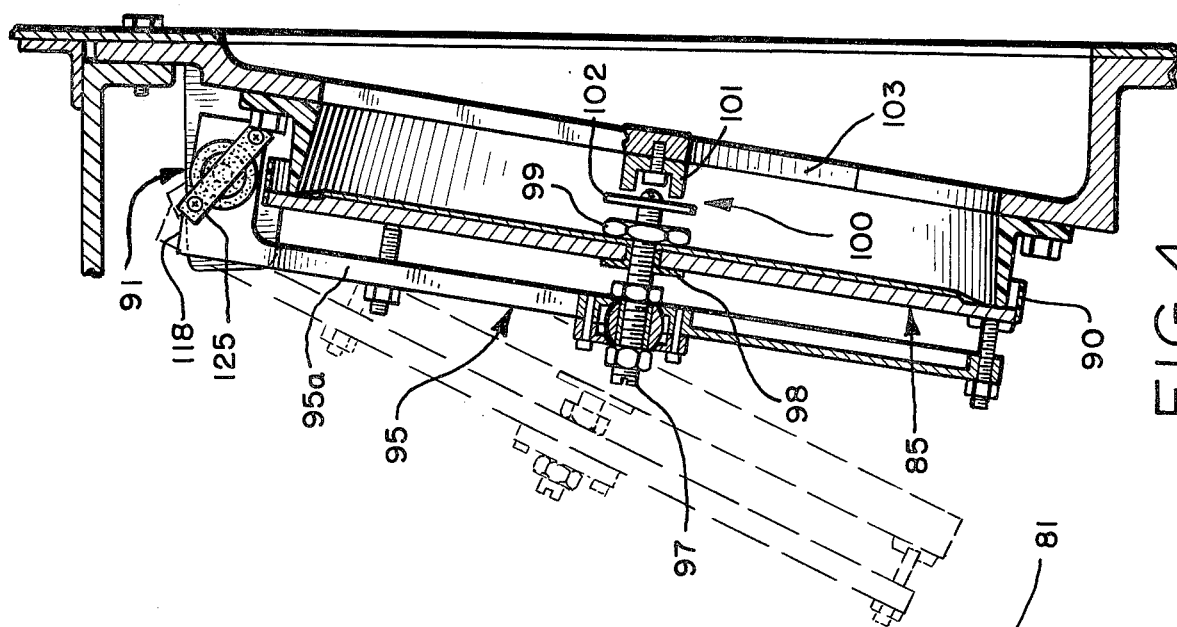
FIG. 4 is a vertical sectional view taken substantially along line 4—4 of FIG. 3.
Figure 3:
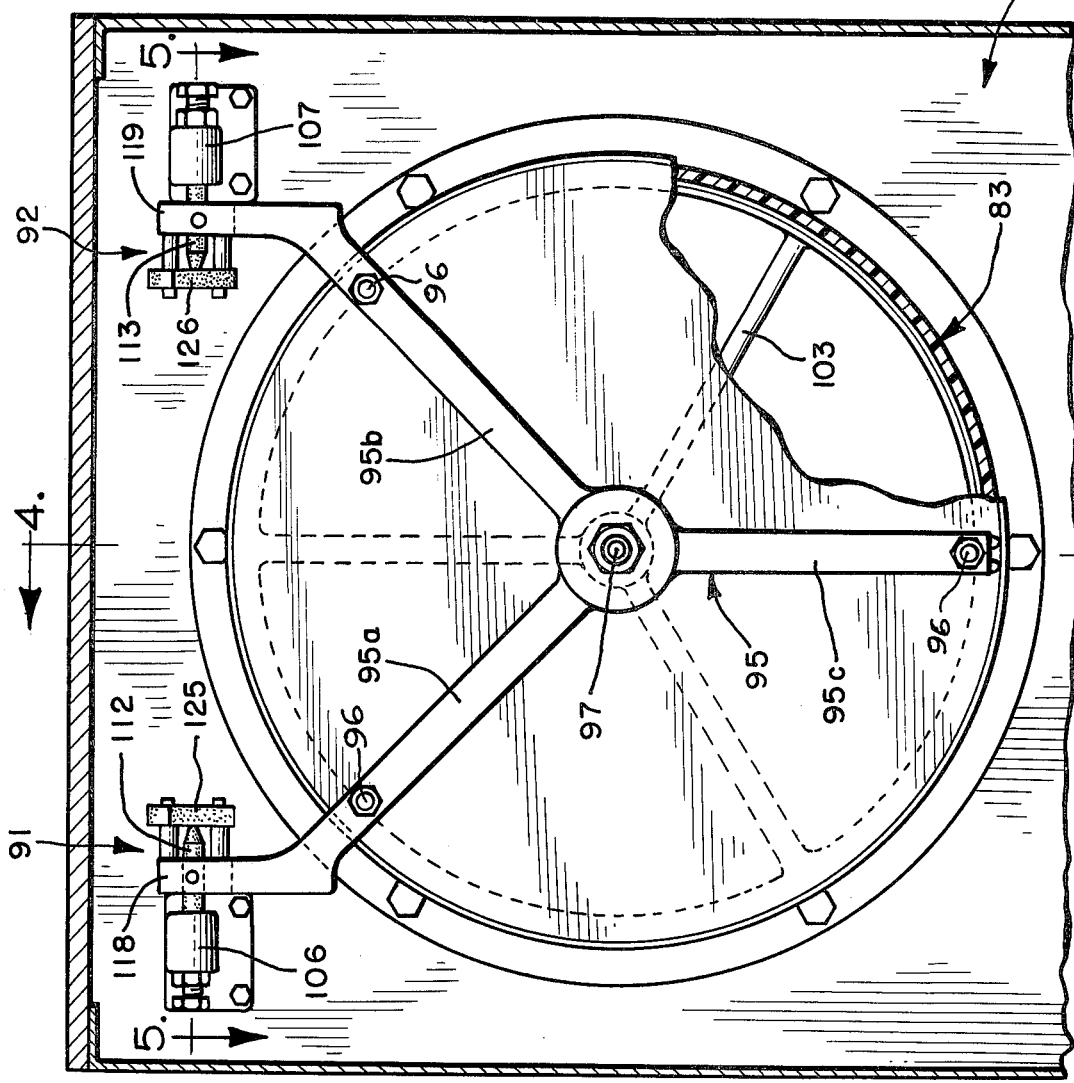
FIG. 3 is an enlarged front elevational view of the vacuum responsive valve portion of the present invention.
Figure 9:
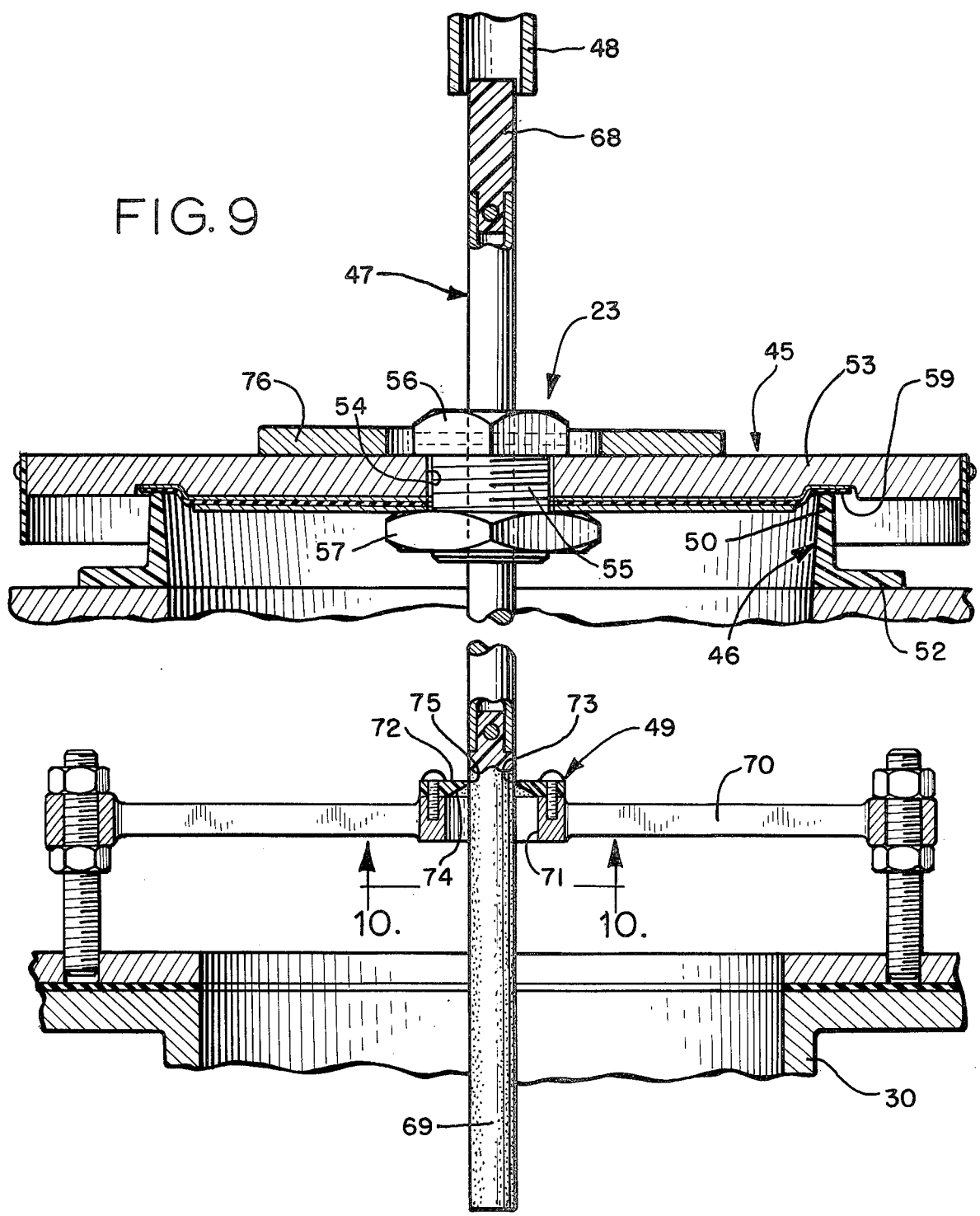
FIG. 9 is a vertical sectional view taken substantially along line 9—9 of FIG. 2.
Figure 10:
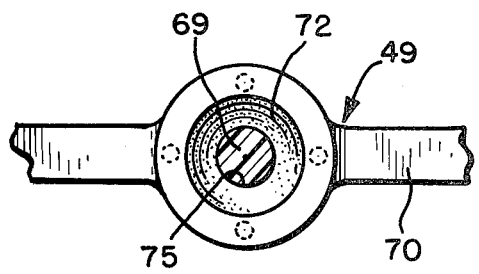
FIG. 10 is a horizontal sectional view taken substantially along line 10—10 of FIG. 9.

The freezeproof breather valve of the present invention is illustrated generally by the numeral 15 in mounted position on a storage tank 16 in FIG. 1. It will be appreciated the storage tank shown is illustrative of the type generally used for storing crude oil wherein the tank is generally cylindrical in shape. However, the breather valve of the present invention may be utilized on any type of tank where there is a need for regulating the vapor pressure within the tank in order to protect the tank against damage that may be caused by excessive pressure conditions. Generally, the breather valve will maintain the tank contents sealed from the atmosphere unless an excessive pressure above or below atmospheric pressure is encountered.

The valve of the invention is especially useful for providing vapor pressure control on tanks located in severe low-temperature climates such as experienced in most of Alaska. Accordingly, the vent for the valve and the valve itself are arranged adjacent the periphery of the tank so that the vent structure can be extended downwardly along the side of the tank with an opening to the atmosphere facing downwardly. Therefore, the accumulation of ice and snow on the top of the tank will not close off the vent opening of the valve. In this respect, the open end of the vent is positioned sufficiently low enough along the side of the tank so that any accumulation of ice and snow which might build up over the edge of the tank and partially down the sides would not normally enclose the open end of the vent.

The breather valve of the invention is of the type that will relieve positive pressures within the tank which might cause explosion and negative pressures within the tank which might cause implosion. However, it should be appreciated that that portion of the valve relieving positive pressures and that portion of the valve relieving negative pressures are each unique in structure so that they can properly function under icing conditions encountered in severe low-temperature climates.

The valve 15 generally includes a housing 20 having a first opening 21 in its lower wall, a second opening 22 in its upper wall associated with the pressure responsive valve portion 23, and a third opening 24 in a side wall associated with a vacuum responsive valve portion 25. Further, a vent housing 26 is mounted on the main valve housing 20 for venting the pressure responsive valve portion and the vacuum responsive valve portion to the atmosphere. It will be appreciated that the structure of the main valve housing is such as to withstand the necessary pressures encountered, while the structure of the vent housing 26 may be of a lesser strength inasmuch as it does not encounter any pressure conditions but only vents the valve portions to the atmosphere. It may be further appreciated that the pressure responsive valve portion, which will be hereinafter generally called the pressure valve, functions to relieve positive pressure conditions relative to atmospheric pressure within the tank which reach above a given level, while the vacuum responsive valve portion 25 will be generally referred to as the vacuum valve and functions to relieve negative pressure conditions relative to atmospheric pressure within the tank that reach a given level.

The openings 21, 22 and 24 in the main valve housing are preferably circular in shape as shown. A pipe section or conduit 30 suitably flanged on opposite ends is connected to one end of a fitting formed on the tank which communicates with the interior of the tank and at the other end with a flange portion formed on the housing 20. Suitable fastening means are employed to secure the pipe section 30 in sealed relation to the fitting on the tank and in sealed relation to the flange on the main valve housing 20. Further, the pipe section 30 will generally serve to support the breather valve in position although additional support means may be provided between the tank and the valve as needed. An access panel 31 is provided in one wall of the main valve housing to permit access to the interior of the housing for performing maintenance on the pressure and vacuum valves.

The vent housing 26 includes a first section 34 which is relatively box-shaped and mounted on the top wall of the main valve housing 20 in overlying relation to the pressure valve 23, a second section 35 of the relatively box shape mounted essentially along the side wall of the main valve housing in alignment with the vacuum valve 25 and also along one side of the vent section 34. The vent section 34 defines a vent chamber 36, while the vent section 35 defines a vent chamber 37, and these chambers are intercommunicating through openings 36a and 37a. The lower end of the vent chamber 37 of the vent section 35 is open and connected to a downwardly extending venting conduit 38 which is open on the lower end to the atmosphere. Accordingly, opening of the pressure valve 23 communicates the interior of the tank with the atmosphere through the vent chambers 36 and 37 and the venting conduit 38, while the opening of the vacuum valve 25 connects the interior of the tank through the atmosphere with the venting chamber 37 and the venting conduit 38.

The pressure valve 23 includes generally a pressure pallet assembly 45 coacting with a seat 46 and means for guiding movement of the pallet assembly along the vertical including a guide rod 47 connected to the pallet assembly, an upper tubular guide member 48 mounted on the vent housing section 34, and a lower guide assembly 49 for the guide rod.

The main pallet seat 46 is constructed of phenolic in one form where it may be molded and includes a cylindrically formed upstanding wall 50 having a seat edge 51 and a radially extending flange 52 at its lower end for receiving fasteners to attach this seat to the upper housing wall. It is the upper seat edge 51 against which the pallet assembly 45 seals when in closed position. The pallet assembly 45 includes a disk-shaped relatively heavily constructed cover member 53 of suitable steel or cast iron material having a centrally positioned hole 54. A threaded fitting 55 is received in the hole 54 and provided with upper and lower nuts 56 and 57 arranged on opposite sides of the cover member 53. The guide rod 47 is suitably secured to the fitting 55 such as by means of a pin extending through the guide rod and the upper nut 56 or in any other suitable manner so that the guide rod is connected to and movable with the pallet assembly. A seal assembly is provided on the underside of the cover member 53 and which includes a backup disk 58 of a suitable flexible cushion-type material, a diaphragm 59 of virgin polytetrafluoroethylene and a retaining plate or disk 60 of a suitable metal. Accordingly, the backup disk 58 and the diaphragm 59 are flexible in form and can conform to the seat edge 51 of the pressure pallet seat 46 when the pallet assembly, sometimes hereinafter generally called pressure pallet, is in closed position relative to the seat. An annular recess 61 is provided in the underside of the cover member 53 in general alignment where the pressure pallet will engage the seat edge 51 of the seat as shown particularly in FIG. 7a. The seal assembly including the backup disk 58, the diaphragm 59 and the retaining plate 60 are locked in place against the underside of the cover by the lower nut 57. Further, the locking of the seal assembly in place effects a vapor-type seal to prevent loss of vapor through the opening 54 in the cover member. The pallet assembly further includes a blowdown ring 62 in the form of a sleeve which is suitably fastened to the periphery of the cover member 53 and which extends downwardly below the lower side of the cover member which functions to cause the vapor being discharged through the pressure valve to be deflected downwardly over the outside of the seat 46. This blowdown ring is also made of virgin polytetrafluorethylene material, one type of which is commonly known as Teflon.

While the pressure pallet seat 46 has been described as being molded of phenolic material, it should be appreciated it can be made of other materials and an alternate form contemplated herein is of cast aluminum having integrally cast heating elements. Specifically, this embodiment is illustrated in FIG. 7 and generally identified by the numeral 46A and wherein the heating elements are generally identified by the numeral 65. It can be appreciated that suitable heating of the seat can avoid freezeup conditions.

The upper end of the pressure pallet guide rod 47 is provided with a plug or insert portion 68 made of virgin polytetrafluorethylene material and which coacts with the upper tubular guide member 48. Similarly, the lower end of the guide rod 47 is provided with a plug or insert portion 69 made of virgin polytetrafluorethylene material. The lower plug 69 coacts with the lower guide assembly 49 which includes a cross arm 70 having an opening 71 therethrough that is substantially larger than the diameter of the plug 69, and a guide ring 72 of special construction and also of virgin polytetrafluorethylene material. The guide ring 72 is suitably secured to the cross arm 70 and includes a center hole 73 sized to loosely receive the plug portion 69 of the guide rod. The upper surface of the ring 72 is flat and extends perpendicular to the guide rod, while the lower surface is provided with a conical wall 74 that effectively tapers the central portion of the guide ring to define a narrow guide edge 75 which coacts with the plug 69. The formation enhances the breakup of any ice forming on this guide assembly and also minimizes ice buildup by allowing condensate to easily fall off gravitationally from the conical surface 74 that faces the interior of the tank.

Accordingly, the parts of the pressure valve sujected to movement when the pressure pallet moves off the seat under pressure are of Teflon material in order to prevent the valve from locking in closed position under icy conditions. The opening threshold pressure of the valve may be somewhat regulated by the application of weights on top of the cover member 53 such as illustrated by the weight 76, and the pallet moves vertically between seated and open positions.

The vacuum pallet 25 is unique in that it is mounted generally along the vertical, as seen particularly in FIG. 2. While the opening in the side wall of the main valve housing 20 shown to be 24 for purposes of describing the invention, it will be appreciated that the entire vacuum valve structure is mounted on a larger opening 80. Accordingly, the vacuum valve includes a base member 81 having a mounting flange 82 inclined to the base, as seen in FIG. 2. The flange 82 is inclined from the vertical wherein the lower end as viewed in FIG. 2 is positioned so that the pallet assembly will gravitationally close on the seat. The valve includes a vacuum pallet seat 83 of the same configuration as the pressure pallet seat 46 and which has its radial flange suitably secured to the mounting flange 82 on the base member 81 of the valve. Alternately, the seat 83 may be of molded phenolic or of cast aluminum with embedded heating elements as already described in connection with the seat for the pressure valve.

The vacuum valve includes a pallet assembly 85 which is generally similar to the pallet assembly of the pressure valve in that it includes a cover member 86, a seal assembly having a backup plate or disk 87, a diaphragm 88 and a retainer plate or disk 89 on the side facing the seat 83. Further, a blowdown ring 90 is provided on the periphery of the cover member 86 like in the pressure pallet assembly. The various components of the pallet assembly already described are made of the same materials as the similar components of the pressure pallet assembly.

The vacuum pallet 85 is supported in position relative the seat 83 by a pair of hinge assemblies 91 and 92 that are identical in construction except of opposite hand. A Y-shaped pallet support member 95 is carried by the hinge assemblies 91 and 92 and connected to the pallet assembly 85. The support member includes arms 95a and 95b directly connected to the hinge assemblies and arm 95c all of which have their end portions in alignment with the pallet assembly 85 and provided with fasteners 96 for connecting the support member to the cover member of the pallet assembly. At the intersection of the support member arms, a further fastening assembly in the form of a stud 97 extends from the support member 95 and is connected to the cover member through a sleeve 98 by a nut 99 to position the cover member on the stud and to also lock the seal assembly to the unerside of the cover member.

Further, in order to provide a magnetic biasing force to the vacuum pallet when in closed position, a magnetic latch 100, which includes a permanent magnet 101 and a magnetically permeable member 102, is provided, wherein the magnetically permeable member 102 is fastened to the stud 97 on the cover member. The permanent magnet 101 is supported by a cross arm structure 103 carried by the base member 81 of the vacuum valve. The magnetic biasing force may be adjusted by adjusting the position of the magnetically permeable member 102 on the stud 97.

The connection between the stud 97 and the Y-shaped pallet support member 95 is such that the position between the support member and the cover member of the pallet assembly may be adjusted in order to properly adjust the cover member when in closed position in order to obtain a proper seal between the diaphragm of the pallet assembly and the seat.

The hinge assemblies 91 and 92 include support blocks 106 and 107 suitably secured to the base member 81. Hinge pins 108 and 109 are mounted in the support blocks. The hinge pins include metal threaded portions 110 and 111 threadedly received in threaded bores formed in the blocks 106 and 107 and pin portions 112 and 113 of virgin polytetrafluorethylene material. The position of the hinge pin in the support block may be adjusted by rotating same and locked in place by lock nuts 114, 115. The pin portions 112 and 113 are engaged by hinge pin bearings 116 and 117 which are respectively held by bearing retaining portions 118 and 119 respectively extending from the ends of arms 95a and 95b of the Y-shaped pallet support member 95. The hinge pin bearings are of virgin polytetrafluorethylene material and constructed similar to the guide ring 72 in the lower guide assembly for the pressure pallet wherein one side of the bearings are conically formed at 120 and 121 to define respectively bearing edges 122 and 123 against which the hinge pin portions 112 and 113 bear.

In order to further align the vacuum pallet relative to the seat and prevent lateral movement of the vacuum pallet, bearing plates 125 and 126 also of virgin polytetrafluorethylene material are mounted in parallel spaced relation from the respective hinge pin bearings and against which the outer ends of the hinge pin portions 112 and 113 will bear. The ends of the portions are conically formed with the very end being flattened. The relationship of the parts is most clearly shown in FIG. 5 to illustrate the manner which prevents lateral movement of the vacuum pallet assembly during movement of the assembly between open and closed positions. Accordingly, it may be appreciated that the movable parts of the hinge assemblies are constructed of Teflon material and otherwise uniquely constructed to avoid freezeup conditions. The hinge assemblies, as well as the lower guide assembly for the pressure pallet, and the diaphragms of the seal assemblies for the pallet assemblies are exposed to the interior of the tank where the water vapor emitted from the contents of the tank and condensing on these parts will be encountered. Accordingly, the pressure and vacuum valves can operate under extremely low temperature conditions where icing will not interfere with the function of the valves when pressure relief is needed to prevent damage to the tank.

It will be understood that modifications and variations may be effected without departing from the scope of the novel concepts of the present invention, but it is understood that this application is to be limited only by the scope of the appended claims.

The invention is hereby claimed as follows:

1. A vacuum responsive vent valve comprising a pallet seat adapted to be mounted in alignment with a vent opening communicating with the interior of a tank, said seat being positioned along a plane slightly tilted from the vertical, a pallet assembly movable between open and closed positions with respect to the seat and having a Teflon seal member engageable with the seat in closed position, hinge means for supporting said pallet assembly including coating Teflon members whereby said pallet assembly moves to closed position under gravitational force, and magnetic means applying a given force to said pallet assembly toward closed position.

2. The combination as defined in claim 1, wherein said Teflon member of said hinge means includes a hinge assembly having a hinge pin and a bearing therefor, one of said hinge pin or bearing being mounted on the pallet assembly and the other being mounted adjacent the pallet seat.

3. The combination as defined in claim 2, wherein said Teflon member of said hinge assembly further includes a plate against which the end of the hinge pin bears.

4. The combination as defined in claim 1, wherein said hinge means includes a pair of hinge assemblies, each hinge assembly having a Teflon hinge pin and a Teflon bearing therefor, one of each said hinge pins being mounted on the pallet assembly and the other being mounted adjacent the pallet seat.

5. The combination as defined in claim 4, wherein each hinge assembly includes a Teflon bearing plate against which the end of the hinge pin bears.

6. The combination as defined in claim 1, wherein said magnet means is located centrally of said pallet.

7. The combination as defined in claim 6, wherein said magnet means is adjustable to vary the given force applied to the pallet assembly.

8. The combination as defined in claim 1, wherein said pallet seat includes heating elements for heating same.

9. The combination as defined in claim 1, wherein said pallet assembly includes a Teflon blowdown flange along its periphery.

10. A pressure relief valve comprising a pallet seat adapted to be mounted in alignment with a vent opening communicating with the interior of a tank, said seat being positioned along a substantially horizontal plane, a pallet assembly movable substantially vertically between open and closed position with respect to the seat and having a Teflon seal member engageable with the seat in closed position, means for applying weight to the pallet assembly, said pallet assembly mounted relative the seat such that it moves upward to open position in response to the pressure within the tank exceeding atmospheric pressure by a given value, guide means for said pallet assembly to guide same between open and closed position so that the assembly properly seats in closed position, said guide means including a vertically extending guide rod mounted on said pallet assembly and extending above and below same, the outer ends of said rod having Teflon portions, a tubular guide member mounted for guidingly receiving the upper end of said rod and a Teflon guide ring for receiving the Teflon portion of the lower end of the rod, and a Teflon blowdown flange mounted along the periphery of the pallet assembly.

11. A combination pressure and vacuum relief valve for a tank comprising, a housing having a first opening for communicating with the interior of the tank, a second opening communicating with the atmosphere and having a pressure relief valve associated therewith, and a third opening communicating with the atmosphere and having a vacuum relief valve, said pressure relief valve including a main pallet seat mounted in alignment with said second opening, said seat being positioned along a substantially horizontal plane, a pallet assembly movable substantially vertically between open and closed position with respect to the seat and having a Teflon seal member engageable with the seat in closed position, means for applying weight to the pallet assembly, said pallet assembly mounted relative the seat such that it moves upward to open position in response to the pressure within the tank exceeding atmospheric pressure by a given value, guide means for said pallet assembly to guide same between open and closed position so that the assembly properly seats in closed position, said guide means including a vertically extending guide rod mounted on said pallet assembly and extending above and below same, the outer ends of said rods having Teflon portions, a tubular guide member mounted for guidingly receiving the upper end of said rod and a Teflon guide ring for receiving the Teflon portion of the lower end of the rod, and a Teflon blowdown flange mounted along the periphery of the pallet assembly.

12. A combination pressure and vacuum relief valve for a tank comprising, a housing having a first opening for communicating with the interior of the tank, a second opening communicating with the atmosphere and having a pressure relief valve associated therewith, and a third opening communicating with the atmosphere and having a vacuum relief valve, said vacuum relief valve including a pallet seat mounted in alignment with said third opening, a pallet assembly movable between open and closed positions with respect to the seat and having a Teflon seal member engageable with the seat in closed position, hinge means for supporting said pallet assembly including coating Teflon members whereby said pallet assembly moves to closed position under gravitational force, and magnetic means applying a given force to said pallet assembly toward closed position.

13. A combination pressure and vacuum relief valve mounted on the top wall of a tank comprising, a housing having a first opening for communicating with the interior of the tank through the top wall thereof, a second opening communicating with the atmosphere and having a pressure relief valve associated therewith, and a third opening communicating with the atmosphere and having a vacuum relief valve, vent means for said pressure and vacuum relief valves covering said valves and connecting same to the atmosphere, said vent means including a vertical downwardly opening member extending down along the side of the tank at a level below the top wall thereof, and said valves having a plurality of movable and coating parts constructed of polytetrafluorethylene material that will prevent malfunction in the event ice collects on said parts.

14. A freezeproof breather valve for a crude oil storage tank for relieving above and below atmospheric pressure conditions therein, said breather valve being mounted on the top wall of the tank and comprising, an above atmospheric pressure relief valve portion, a below atmospheric pressure relief valve portion and a venting means for said valve portions having a downwardly facing opening arranged alongside of the tank at a level below the top of the tank such as to avoid being sealed by the buildup of ice and snow on the tank, said valve portions having movable components of polytetrafluorethylene material.

15. The valve as defined in claim 14, wherein said above atmospheric pressure relief valve portion includes a circular horizontally arranged pallet seat, a pallet assembly movable between seated and open positions relative said pallet seat and having a seal member of polytetrafluorethylene material engaging the seat, and guide means for guiding the movement of the pallet assembly, said guide means including coacting parts of polytetrafluorethylene material.

16. The valve as defined in claim 15, wherein said guide means includes a guide rod centrally positioned on the pallet assembly and projecting above and below same, upper and lower plugs at opposite ends of polytetrafluorethylene material, an upper tubular guide member coacting with said upper plug, and a lower guide assembly including a guide ring of polytetrafluorethylene material guidably receiving the lower plug.

17. The valve as defined in claim 15, wherein said seat is of phenolic material.

18. The valve as defined in claim 15, wherein said seat is of aluminum material with integral heating elements.

19. The valve as defined in claim 15, wherein said below atmospheric pressure relief valve portion includes a circular pallet seat arranged at a slight incline from the vertical, a pallet assembly mounted for movement between seated and open positions relative said pallet seat and having a seal member of polytetrafluorethylene material engaging the seat, magnetic means for applying a magnetic biasing force to said pallet toward seated position, and hinge means for hingedly mounting the pallet assembly having coacting bearing parts of polytetrafluorethylene material.

20. The valve as defined in claim 14, wherein said below atmospheric pressure relief valve portion includes a circular pallet seat arranged at a slight incline from the vertical, a pallet assembly mounted for movement between seated and open positions relative said pallet seat and having a seal member of polytetrafluorethylene material engaging the seat, magnetic means for applying a magnetic biasing force to said pallet toward seated position, and hinge means for hingedly mounting the pallet assembly having coacting bearing parts of polytetrafluorethylene material.

* * * * *

UNITED STATES PATENT AND TRADEMARK OFFICE
CERTIFICATE OF CORRECTION

PATENT NO. : 4,091,837
DATED : May 30, 1978
INVENTOR(S) : Robert H. Edmunds, et al.

It is certified that error appears in the above-identified patent and that said Letters Patent are hereby corrected as shown below:

```
Col. 5, line 41, change "The" to --This--;
Col. 6, line 33, change "unerside" to --underside--;
Col. 7, line 12, change "flattened" to --flatted--;
        line 45, change "coating" to --coacting--;
Col. 8, line 57, change "rods" to --rod--;
Col. 9, line 7,  change "coating" to --coacting--;
        line 25, change "coating" to --coacting--.
```

Signed and Sealed this

Fifth Day of December 1978

[SEAL]

Attest:

RUTH C. MASON
Attesting Officer

DONALD W. BANNER
Commissioner of Patents and Trademarks